(12) United States Patent
Neuman et al.

(10) Patent No.: US 12,134,351 B2
(45) Date of Patent: Nov. 5, 2024

(54) CONCEALMENT PANEL WITH ASYMMETRIC REFLECTANCE

(71) Applicant: GENTEX CORPORATION, Zeeland, MI (US)

(72) Inventors: George A. Neuman, Holland, MI (US); Mario F. Saenger Nayver, Zeeland, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 541 days.

(21) Appl. No.: 17/479,041

(22) Filed: Sep. 20, 2021

(65) Prior Publication Data

US 2022/0089091 A1    Mar. 24, 2022

Related U.S. Application Data

(60) Provisional application No. 63/080,367, filed on Sep. 18, 2020.

(51) Int. Cl.
  *B60R 1/08*     (2006.01)
  *G02B 1/115*    (2015.01)
  *G02B 5/08*     (2006.01)

(52) U.S. Cl.
  CPC ............... *B60R 1/08* (2013.01); *G02B 1/115* (2013.01); *G02B 5/0816* (2013.01)

(58) Field of Classification Search
  CPC .... B60R 1/08; B60R 1/02; B60R 1/04; B60R 1/083; B60R 1/20; B60R 1/29;
  (Continued)

(56) References Cited

U.S. PATENT DOCUMENTS 5,619,374 A      4/1997   Roberts
7,887,201 B2 *   2/2011   Hoeing ............... C03C 17/3663
                                                       359/884

(Continued)

FOREIGN PATENT DOCUMENTS

WO    WO-2006105209 A2 *  10/2006  ............. B60R 1/088

OTHER PUBLICATIONS

International Search Report dated Dec. 23, 2021, for corresponding PCT application No. PCT/US2021/051014, 2 pages.

(Continued)

*Primary Examiner* — Arnel C Lavarias
(74) *Attorney, Agent, or Firm* — Price Heneveld LLP; Brian James Brewer

(57) ABSTRACT

An asymmetrically reflective member is disclosed. This asymmetrically reflective member may be utilized in a rearview assembly to hide an imager disposed there behind. The member may comprise a substrate and an asymmetric transflective coating. The substrate may have a first side and a second side. The asymmetric transflective coating may be associated with the substrate. Additionally, the asymmetric transflective coating may have a transflective layer, a plurality of dielectric layers, and one or more absorptive layers interleaved with the plurality of dielectric layers. Further, the member may have a first side and a second side. The reflectance of the first side may be substantially greater than the reflectance of the second side.

20 Claims, 10 Drawing Sheets

(58) Field of Classification Search
CPC ......... B60R 1/30; G02B 1/115; G02B 5/0816;
G02B 1/10; G02B 5/08; G02B 5/085;
G02B 5/0858; G02B 5/0875; G02B 5/28;
G02B 5/281; G02B 5/285; G02F 1/15;
G02F 1/153; G02F 1/1533
USPC ....... 359/602, 245, 265, 267, 275, 350, 359,
359/360, 601, 603, 604, 608, 609, 614,
359/838, 839, 884, 577, 580, 584, 585,
359/586, 588, 589, 590; 362/494
See application file for complete search history.

(56) References Cited

U.S. PATENT DOCUMENTS

| | | |
|---|---|---|
| 10,739,661 B2 | 8/2020 | Saenger Nayver |
| 2008/0297879 A1 | 12/2008 | Tonar et al. |
| 2010/0097469 A1 | 4/2010 | Blank et al. |
| 2011/0019284 A1* | 1/2011 | Hoeing ................ G02B 5/0858 359/630 |
| 2017/0155095 A1* | 6/2017 | Tsai ..................... H10K 59/879 |
| 2018/0017834 A1 | 1/2018 | Neuman et al. |
| 2018/0246265 A1 | 8/2018 | Neuman |

OTHER PUBLICATIONS

Written Opinion dated Dec. 23, 2021, for corresponding PCT application No. PCT/US2021/051014, 5 pages.

* cited by examiner

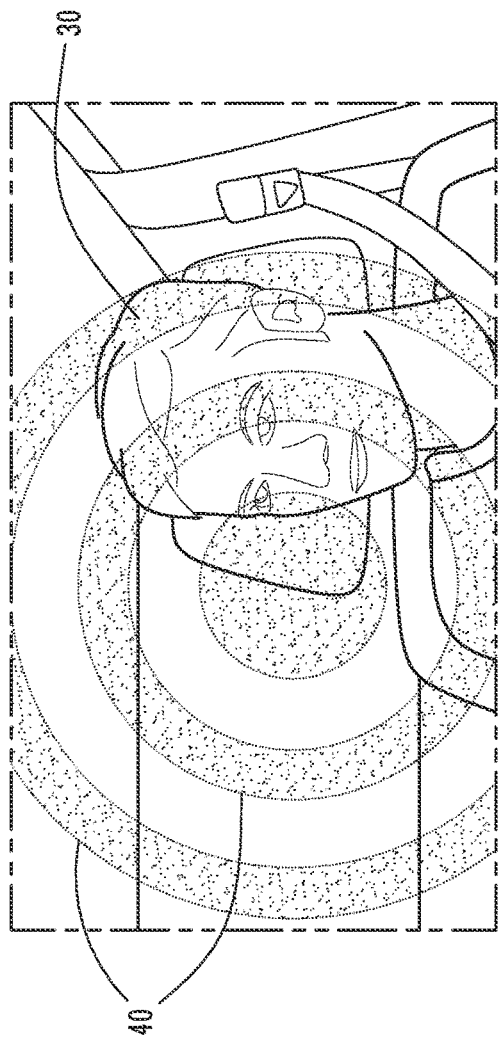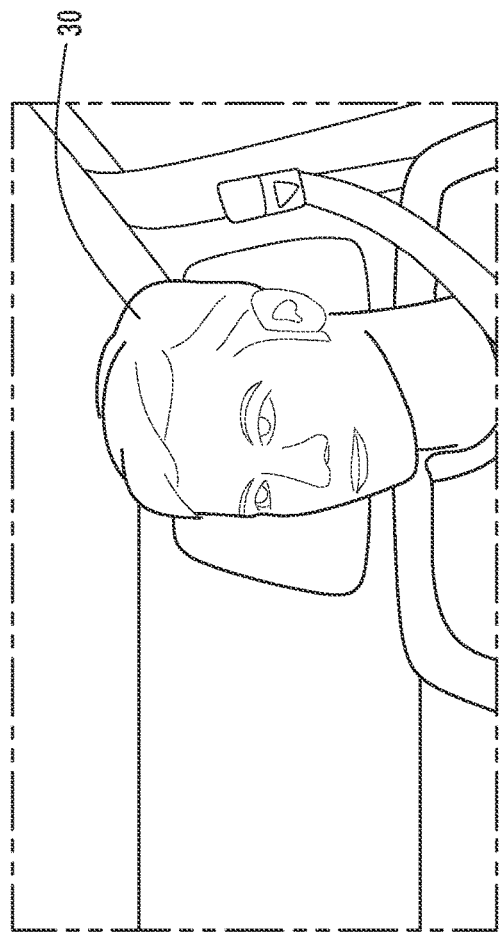

CONCEALMENT PANEL WITH ASYMMETRIC REFLECTANCE

CROSS-REFERENCE TO RELATED APPLICATIONS

This application claims priority under 35 U.S.C. § 119(e) to U.S. Provisional Application No. 63/080,367 filed on Sep. 18, 2020, entitled "IMAGING APPARATUS WITH CONCEALMENT PANEL WITH ASYMMETRIC REFLECTANCE" the disclosure of which is hereby incorporated by reference in its entirety.

FIELD OF INVENTION

The present invention relates, in general, to transflective concealment panels for imaging systems and, more particularly, to directionally reflective concealment panels.

SUMMARY

In accordance with the present disclosure, the problems associated with illuminating a cabin and/or driver with in the infra-red and/or near infra-red regions of the electromagnetic spectrum are substantially reduced or eliminated.

According to one aspect of the present disclosure, a rearview assembly is disclosed. The rearview assembly may comprise a transflective concealment panel and an imager. The transflective concealment panel may have a first side directed in a first direction and a second side directed in a second direction. The second direction may be opposite the first direction. Additionally, a reflectivity at the first side may be greater than at the second side. In some embodiments, the reflectance at the reflectance at the first side is greater than or equal to five times the reflectance at the second side. In some embodiments, the reflectance at the second side is less than or equal to 10%. Further, the concealment panel may comprise an asymmetric transflective coating. The asymmetric transflective coating may have a transflective layer, a plurality of dielectric layers, and one or more absorptive layers. The plurality of dielectric layers may be disposed in the second direction relative the transflective layer. The one or more absorptive layers interleaved with the plurality of dielectric layers. The imager may be disposed in the second direction relative the concealment panel and operable to capture light transmitted through the concealment panel and generate an image. In some embodiments, the rearview assembly may further comprise an anti-reflective coating disposed in the second direction relative the asymmetric transflective coating.

In some embodiments, the transflective layer may have a refractive index of less than or equal to 2.0. In some embodiments, the transflective element may have an imaginary portion of a refractive index of that is greater than a real portion of the refractive index. In some such embodiments, the imaginary portion may be more than five times greater than the real portion. In some embodiments, the transflective layer may comprise a multi-layer stack of alternating high and low refractive index layers. In some such embodiments, the alternating high and low refractive index layers are comprised of dielectric materials.

In some embodiments, the dielectric layers may have a refractive index between about 1.37 and about 4.00.

In some embodiments, refractive indices of the absorptive layers have a refractive index of between about 1.0 and about 6.0. In some such embodiments, an imaginary portion of the refractive index may be less than or equal to about three times a real portion of the refractive index. In some embodiments, an absorptive layer of the one or more absorptive layers may make direct contact with the transflective layer.

In some embodiments, the rearview assembly may further comprise a variably transmissive electro-optic element. The variably transmissive electro-optic element may be operable to substantially vary the reflectance of the concealment panel at the first side. Further, the electro-optic element may have a first substrate, a second substrate, a first electrode, a second electrode, and an electro-optic medium. The first substrate may have a first surface and a second surface. The first surface may be disposed in the first direction relative the second surface. The second substrate may be disposed in a spaced apart relationship relative the first substrate. Additionally, the second substrate may have a third surface and a fourth surface. The fourth surface may be disposed in the second direction relative the third surface. The first electrode may be associated with the first substrate. The second electrode may be associated with the second substrate. The electro-optic medium may be operable between substantially activated and un-activated states based, at least in part, on an electrical potential. Additionally, the electro-optic medium may be disposed between the first and second substrates and in the first direction relative the asymmetric transflective coating. In such some embodiments, the asymmetric transflective coating may be associated with the third surface. In other such embodiments, the asymmetric transflective coating may be associated with the fourth surface.

In accordance with another aspect of the present disclosure, a member is disclosed. The member may comprise a substrate and an asymmetric transflective coating. The substrate may have a first side and a second side. The asymmetric transflective coating may be associated with the substrate. Additionally, the asymmetric transflective coating may have a transflective layer, a plurality of dielectric layers, and one or more absorptive layers interleaved with the plurality of dielectric layers. Further, the member may have a first side and a second side. The reflectance of the first side may be substantially greater than the reflectance of the second side. In some embodiments, the reflectance of the first side may be greater than or equal to five times the reflectance of the second side. In some embodiments, the reflectance at the second side may be less than or equal to 10%. In some embodiments, an absorptive layer may make direct contact with the transflective layer.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 7a: A representation of an image of a subject with ghost images;

FIG. 7b: A representation of an image of a subject without ghost images;

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating to the embodiments disclosed herein are not limiting, unless the claims expressly state otherwise.

In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. As used in this application, Y (sometimes also referred to as Cap Y), represents either the overall reflectance or the overall transmittance, depending on context. L*, a*, and b* can be used to characterize parameters of light in either transmission or reflection. According to the L*a*b* quantification scheme, L* represents brightness and is related to the eye-weighted value of either reflectance or transmittance (also known as normalized Y Tristimulus value) by the Y Tristimulus value of a white reference, Yref: L*=116*(Y/Yref)−16. The a*-parameter is a color coordinate that denotes the color gamut ranging from red (positive a*) to green (negative a*), and b* is a color coordinate that denotes the color gamut ranging from yellow and blue (positive and negative values of b*, respectively). As used in this application, Y (sometimes also referred to as Cap Y), represents the overall reflectance weighted to the human eye's sensitivity to visible light. For example, absorption spectra of an electrochromic medium, as measured at any particular voltage applied to the medium, may be converted to a three-number designation corresponding to a set of L*, a*, and b* values. To calculate a set of color coordinates such as (L*, a*, b*) values from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a (reflectance) value Y from the 1964 CIE Standard since it corresponds more closely to the spectral reflectance than L*.

Figure 1:
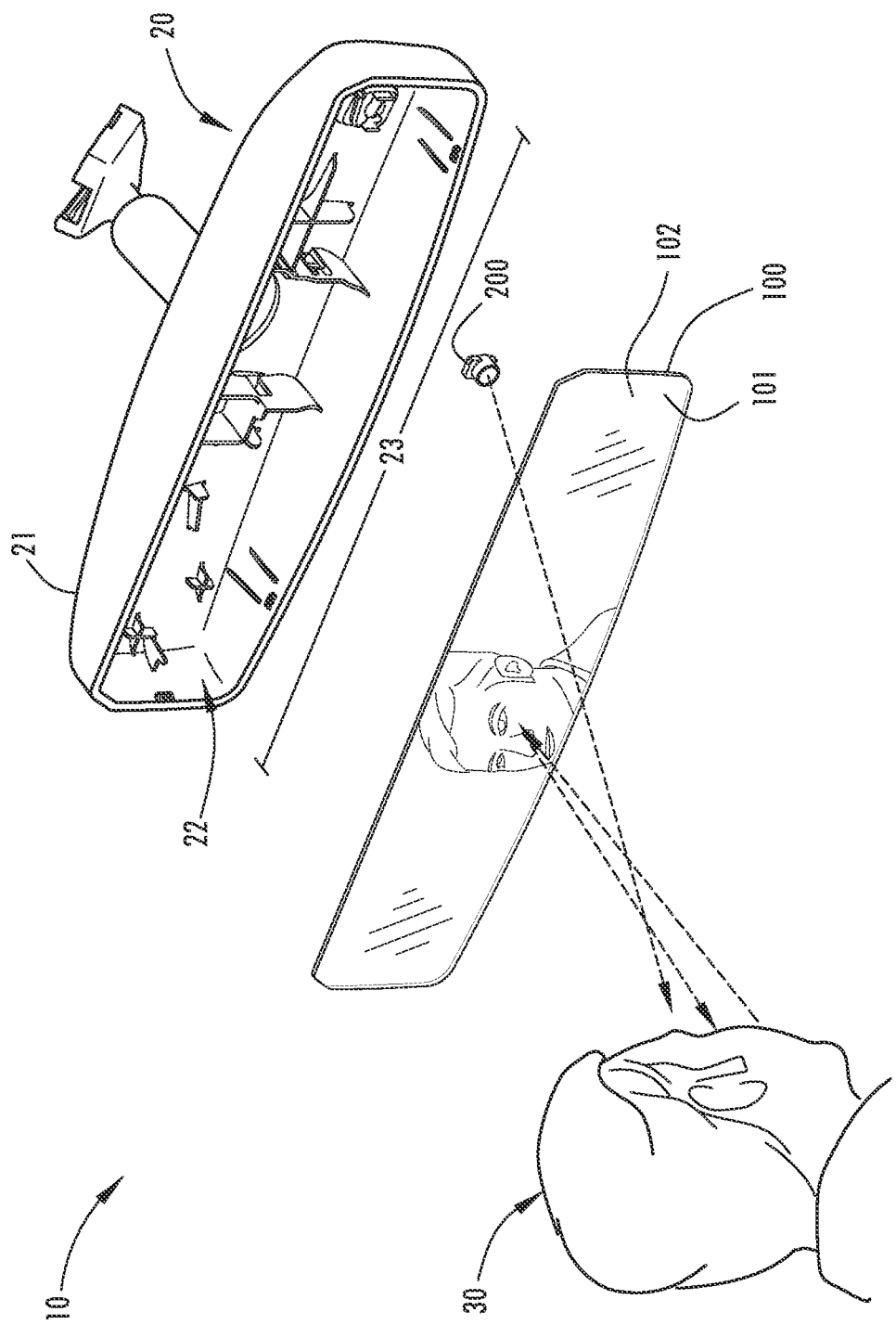
FIG. 1: Schematic representation of an embodiment of a concealment panel and aspects of a system incorporating such.
Figure 2:
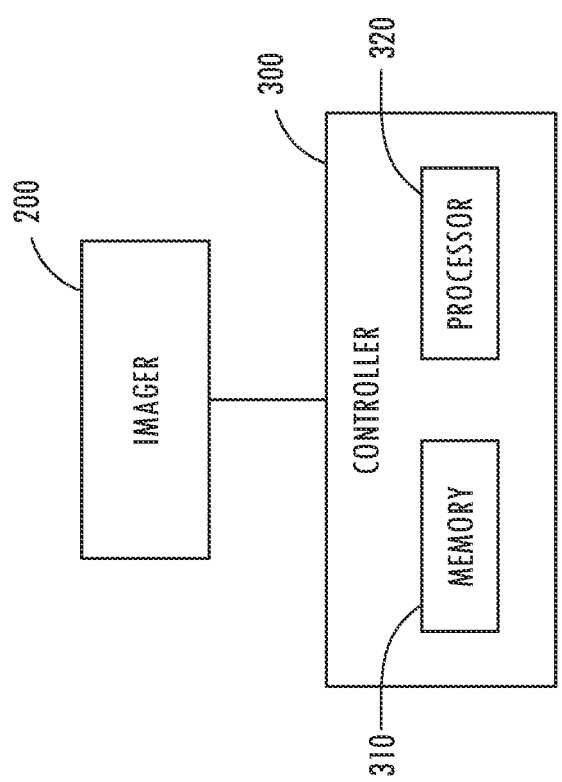
FIG. 2: Aspects of a system incorporating a concealment panel.

The present disclosure is directed to a concealment panel 100. In some embodiments, concealment panel 100 may be incorporated into an imaging system 10, as shown in FIGS. 1-2. Imaging system 10 may comprise concealment panel 100, an imager 200, and/or a controller 300. In some embodiments, one or more elements of imaging system 10 may be incorporated into a rearview assembly 20 of a vehicle, such as an interior rearview assembly 20. Further, rearview assembly 20 may be operable to provide a driver with a view of a scene to the rear of the vehicle. Additionally, rearview assembly 20 may have a housing 21.

Housing 21 may be mounted to the interior of the vehicle. In some embodiments, housing 21 may be mounted, more specifically, at a windshield of the vehicle. Further, housing 21 may define an cavity 22 there within. Additionally, housing 21 may have an opening 23. Opening 23 may be formed in housing 21 such that opening 23 substantially faces the driver.

Concealment panel 100 may be transflective. Further, concealment panel 100 may have a first side 101 and a second side 102. First side 101 may be directed in a first direction, and second side 102 may be directed in a second direction substantially opposite the first direction. Further, first side 101 may be substantially directed toward a subject 30. Accordingly, second side 102 may be substantially directed away from subject 30. Subject 30, for example, may be an occupant of the vehicle, such as the driver or a passenger. In some embodiments, the reflectance at first side 101 may be equal to or greater than 40, 50, or 60% in the visible region of the electromagnetic spectrum. Additionally, the reflectance at second side 102 may be equal to or less than 20, 15, 10, or 5% in the visible region of the electromagnetic spectrum. Thus, concealment panel 100 may provide asymmetric reflectance. This asymmetric reflectance may be such that the reflectance is approximately five or more times greater at first side 101 than at second side 102. Further, the transmittance from first side 101 through second side 102 may be equal to or greater than 5, 10, 15, 20, or 25% in the visible region of the electromagnetic spectrum. In embodiments where concealment panel 100 is incorporated into rearview assembly 20, concealment panel 100 may be disposed such that it is in substantial alignment with opening 23. In such an embodiment, first side 101 may be directed to away from cavity 22. Conversely, second side 102 may be directed to cavity 22.

Concealment panel 100 may be operable to substantially reflect light impinging concealment panel 100 from the first direction. The reflected light may have a first wavelength range. The first wavelength range may be within the visible region of the electromagnetic spectrum. Thus, concealment panel 100 may operate as a visible light mirror. The visible region, as discussed herein, is defined as between approximately 380 and 740 nm. Additionally, concealment panel 100 may be operable to substantially transmit light in a second wavelength range from first side 101 through second side 102. The second wavelength range may be within the visible, infra-red, and/or near infra regions of the electromagnetic spectrum. Thus, in some embodiments, the second wavelength range may be the same as, include, or be a part of the first wavelength range. As such, concealment panel 100 may be operable to substantially transmit light in the second wavelength range from the exterior of cavity 22 to the interior of cavity 22. The near infra red region, as discussed herein, is defined as between approximately 780 and 940 nm.

Figure 4:
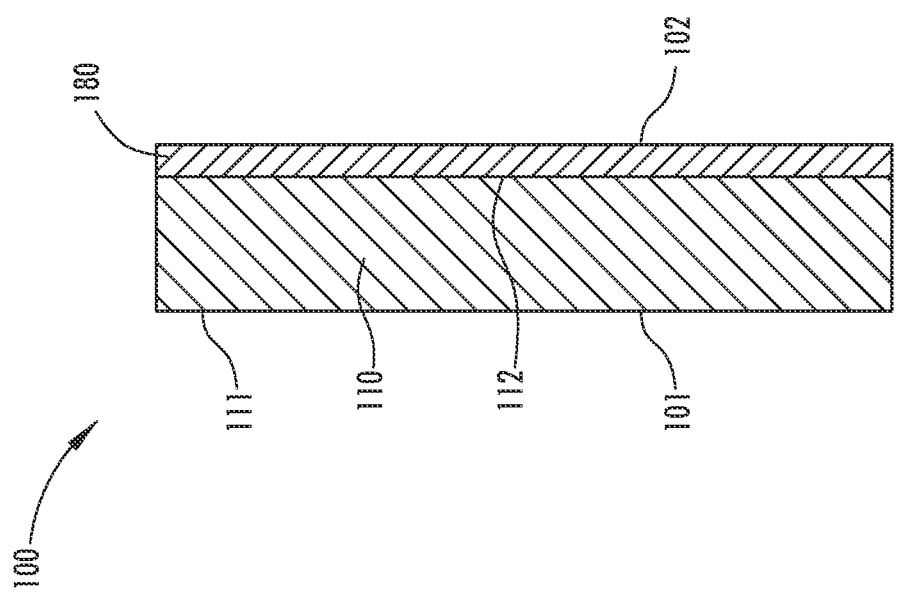
FIG. 4: A cross-sectional schematic representation of an embodiment of a concealment panel.
Figure 5:
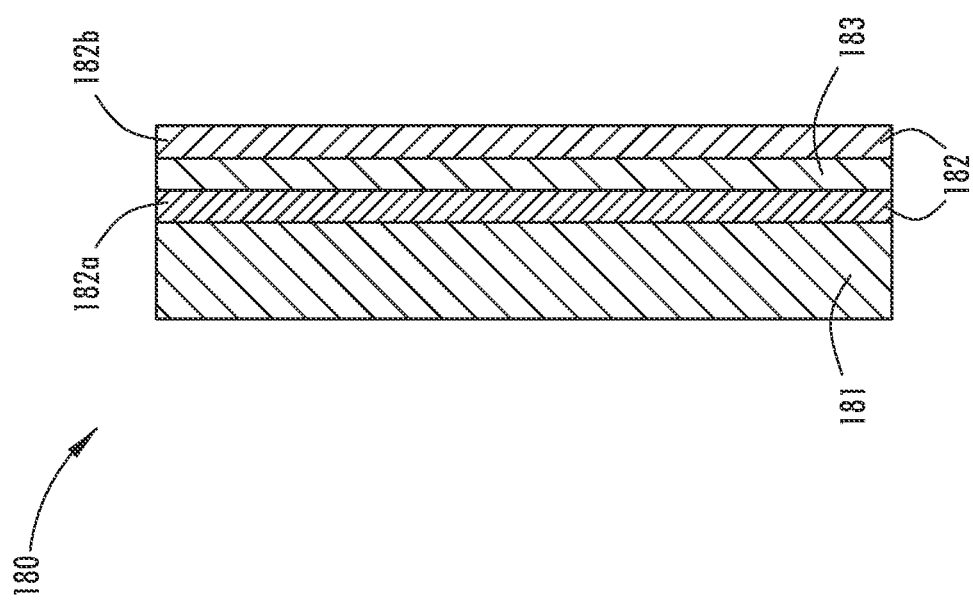
FIG. 5: A cross-sectional schematic representation of an embodiment of an asymmetric transflective coating.

Concealment panel 100 may have a variably reflective and/or transmissive construction or may have a reflectively and/or transmissivity fixed construction. In embodiments where concealment panel 100 has a variably reflective and/or transmissive construction, such as shown in FIG. 5, concealment panel 100 may be or comprise and electro-optic element. Accordingly, concealment panel 100 may comprise a first substrate 110, a second substrate 120, a first electrode 130, a second electrode 140, a seal 150, a chamber 160, electro-optic medium 170, and/or an asymmetric transflective coating 180. In embodiments where concealment panel 100 has a reflectively and/or transmissivity fixed construction, such as shown in FIG. 4, concealment panel 100 may simply comprise first substrate 110 and asymmetric transflective coating 180.

First substrate 110 comprises a first surface 111 and a second surface 112. In some embodiments, first surface 111 may correspond to first side 101. Further, first substrate 110 may be fabricated from any one of a number of materials that are transparent or substantially transparent in the visible region of the electromagnetic spectrum, such as borosilicate glass, soda lime glass, float glass, natural and synthetic polymeric resins, plastics, and/or composites including Topas®, which is commercially available from Ticona of Summit, N.J. While particular substrate materials are disclosed, for illustrative purposes only, other materials known in the art may be used.

Second substrate 120 may be disposed in a spaced apart relationship with first substrate 110. Further, second substrate 120 comprises a third surface 123 and a fourth surface 124. Additionally, second substrate 120 may be disposed such that third surface 123 faces second surface 112. Thus, fourth surface 124 may correspond to second side 102. Also, second substrate 120 may be fabricated from similar materials as those suitable for first substrate 110. In some embodiments, in addition to or in alternative to the utilization of asymmetric transflective coating 180, second substrate 120 may be substantially tinted. Thus, second substrate 120 may have a transmittance of less than or equal to 60, 55, 50, 45, or 40%. In some such embodiments, the tint may be achieved by a material composition of second substrate 120 and/or a tinting film on the third and/or fourth 123, 124 surfaces.

First electrode 130 is an electrically conductive material associated with second surface 112. The electrically conductive material may be substantially transparent in the visible region of the electromagnetic spectrum and generally resistant to corrosion from materials contained in chamber 160. Accordingly, for example, the electrically conductive material may be a transparent conductive oxide (TCO) such fluorine doped tin oxide (FTO), indium tin oxide (ITO), or indium zinc oxide (IZO).

Similarly, second electrode 140 is an electrically conductive material associated with third surface 123. Further, the electrically conductive material of second electrode 140 may be comprised of the same materials as those suitable for first electrode 130. In some embodiments, second electrode 140 may comprise reflective element 180.

Seal 150 may be disposed between the first and second substrates 110, 120 in a peripheral manner to define a chamber 160 in combination with juxtaposed first and second electrodes 130, 140. Further, seal 150 may comprise any material capable of being adhesively bonded to first and second electrodes 130, 140 to in turn seal chamber 160, such that the electro-optic medium 170 may not inadvertently leak out. Additionally, seal 150 may extend to the second and/or third surfaces 112, 123. In such an embodiment, the first and second electrodes 130, 140 may be partially removed where seal 150 is positioned. Alternatively, sealing member 150 may be disposed about and extending between the peripheries of the first and second substrates 110, 120.

Electro-optic medium 170 may be disposed in chamber 160. In some embodiments, electro-optic medium 170 may be an electrochromic medium. An electrochromic medium may comprise at least one solvent, at least one anodic material, and/or at least one cathodic material. While both anodic and cathodic materials may be electroactive, at least one of them is electrochromic. Thus, at least one of which may be regarded as an electrochromic component. Regardless of its ordinary meaning, the term "electroactive" will be defined herein as a material that undergoes a modification in its oxidation state upon exposure to a particular electrical potential. Thus, electro-optic medium 170 is operable to enter and/or maintain an activated state upon exposure to an electrical potential. Additionally, the term "electrochromic" will be defined herein, regardless of its ordinary meaning, as a material that exhibits a change in its extinction coefficient at one or more wavelengths upon exposure to a particular electrical potential difference. Accordingly, in an activated state, electro-optic medium 170 may be operable to exhibit a change, relative an un-activated state, in its extinction coefficient at one or more wavelengths in the electromagnetic spectrum. In some embodiments, this change may occur in the visible region of the electromagnetic spectrum. Additionally, electro-optic medium 170 may be operable to transmit light in the first wavelength range while in both activated and de-activated sates. Accordingly, the change in extinction coefficient may occur at a wavelength outside of the first wavelength range.

The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration-Enhanced Stability, Process for the Preparation Thereof and Use in Electrochromic Devices," U.S. Pat. No. 6,519,072, entitled "Electrochromic Device"; and International Patent Publication Nos. WO 98/42796 entitled "Electrochromic Polymeric Solid Films, Manufacturing Electrochromic Devices Using Such Solid Films, and Processes For Making Such Solid Films And Devices," and WO 99/02621 entitled "Electrochromic Polymer Systems," which are herein incorporated by reference in their entirety.

In embodiments where concealment panel 100 has a variably reflective and/or transmissive construction, asymmetric transflective coating 180 may be disposed in the second direction relative electro-optic medium 170, such that light reflected therefrom must pass through electro-optic medium 170. Thus, electro-optic medium 170 may be activated changing the amount of light available for transmission through and/or reflection off concealment panel 100. Accordingly, the rearview assembly, in some embodiments, may be operable to dim. In some embodiments, asymmetric transflective coating 180 may be associated with fourth surface 124. In other embodiments, asymmetric transflective coating 180 may be associated with third surface 123. In some such embodiments, asymmetric transflective coating 180 may be second electrode 140 and/or a part of second electrode 140. Accordingly, asymmetric transflective coating 180 may be electrically conductive. Alternatively, in embodiments where concealment panel 100 has a reflectively and/or transmissivity fixed construction, asymmetric transflective coating 180 may be associated with either of the first or second surfaces 111, 112. Additionally, as shown in FIG. 5, asymmetric transflective coating 180 may comprise: a transflective layer 181, a plurality of dielectric layers 182, and one or more absorptive layer 183.

Transflective layer 181 may be composed of a low refractive index metal. A low refractive index metal may be a metal with an index of refraction of less than or equal to about 2.0. Exemplary low refractive index materials may include silver, a silver alloy, copper, gold, zinc, aluminum, other low refractive index metals and/or combinations thereof. In some embodiments, the low refractive index material may be doped. Exemplary dopants may include gold, palladium, platinum, rhodium, titanium, aluminum, zinc, copper, tin, silicon, germanium, manganese, magnesium, tungsten, lead, boron, chromium, thorium, tantalum, lithium, indium other dopants and/or combinations thereof. These dopants may be used to alter the optical properties of the host low refractive index material (e.g., silver), improve durability in environmental testing or improve the electrochemical stability of the low refractive index material. Further, transflective layer 181 may be substantially monolithic. In some embodiments, transflective layer 181 may have a real refractive index of less than or equal to about 2.0, 1.5, 1.0 or 0.5. According to various examples, an imaginary portion of the refractive index of transflective layer 181 may be greater than the real portion. For example, the imaginary portion of the refractive index may be about or more than 2.5 times, 5.0 times, 7.5 times, or 10 times the real portion of the refractive index. Additionally, transflective layer 181 may have a thickness of between about 5 nm to about 25 nm, or between about 9 nm to about 20 nm. Alternatively, the transflective layer may comprise a multi-layer stack of alternating relatively high and low refractive index layers whose thicknesses and refractive indices are tuned to create a transflective optical performance. In some embodiments, these alternating layers may comprise dielectric materials. The dielectric materials may be ITO, $SnO_2$, SiN, $MgF_2$, $SiO_2$, $TiO_2$, $F:SnO_2$, $NbO_X$, $TaO_X$, indium zinc oxide, aluminum zinc oxide, zinc oxide, electrically conductive $TiO_2$, $CeO_X$, ZnS, chromium oxide, $ZrO_X$, $WO_3$, nickel oxide, $IrO_2$, $NiO_X$, $CrO_X$, $NbO_X$, and/or $ZrO_X$, or other material with a refractive index between about 1.37 and about 4.0. In some embodiments, transflective layer 181 may have a reflectance equal to or greater than 40, 50, or 60%.

In embodiments where concealment panel 100 has a variable reflective and/or transmissive construction, transflective layer 181 may be associated with second substrate 120. Further, transflective layer 181 may be associated with second substrate 120 via the third or fourth surfaces 123, 124. In such embodiments where transflective layer 181 is associated with third surface 123, transflective layer 181 may be electrically conductive and thus may serve as second electrode 140.

In embodiments where concealment panel 100 has a reflectively and/or transmissivity fixed construction transflective layer 181 may be associated with first substrate 110. Further, transflective layer 181 may be associated with first substrate 110 via the first or second surfaces 111, 112.

Dielectric layers 182 may be composed of a dielectric material and/or transparent conducting oxide. These layers may be further subdivided into sub-layers with the same or different refractive indices as one another. The dielectric material and/or transparent conducting oxide may be ITO, $SnO_2$, SiN, $MgF_2$, $SiO_2$, $TiO_2$, $F:SnO_2$, $NbO_X$, $TaO_X$, indium zinc oxide, aluminum zinc oxide, zinc oxide, electrically conductive $TiO_2$, $CeO_X$, ZnS, chromium oxide, $ZrO_X$, $WO_3$, nickel oxide, $IrO_2$, $NiO_X$, $CrO_X$, $NbO_X$, and/or $ZrO_X$, or other material with a refractive index between about 1.37 and about 4.0. The thickness of the dielectric layers may vary over a wide range of thicknesses to simultaneously tune the reflected and transmitted properties. Dielectric layers 182 may comprise any number of layers two or greater. Accordingly, dielectric layers 182 may comprise a first dielectric layer 182*a* and a second dielectric layer 182*b*. The first dielectric layer 182*a* may have a thickness of between about 40 nm to greater than about 500 nm. The second dielectric layer 182*b* may have a thickness of between about 20 nm to about 100 nm.

Further, dielectric layers 182 may be associated with transflective layer 181 and disposed in the second direction relative transflective layer 181. Further, second dielectric layer 182*b* may be disposed in the second direction relative first dielectric layer 182*a*. Accordingly, in embodiments where transflective layer 181 is associated with the first or third surfaces 111, 123, dielectric layers 182 may be disposed between transflective layer 181 and the first or second substrates 110, 120, respectively. Alternatively, in embodiments where transflective layer 181 is associated with the second or fourth surfaces 112, 124, transflective layer 181 may be disposed between dielectric layers 182 and the first or second substrates 110, 120.

The one or more absorptive layers 183 may be formed form an absorbing material. The absorbing material may be a metal, a metal oxide, a metal nitride and/or combinations thereof or other materials that meet the refractive index design criterial described below. Exemplary metals may include chromium, molybdenum, nickel, inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, alloys thereof, and combinations thereof. The absorbing material may have a refractive index of between about 1.0 and about 6.0, or between about 2.0 and about 5.0, or between about 2.2 and about 4.8. An imaginary refractive index for the absorbing material may be less than or equal to about three times or less than or equal to about two times the real portion of the refractive index. A thickness of the absorbing layer may be between about 0.5 nm and 10 nm, or between about 1 nm and 6 nm. Additionally, each absorptive layer 183 of the one or more absorptive layers 183 may be disposed between two adjacent layers of the one or more dielectric layers 182. For example, an absorptive layer 183 may be disposed between the first and second dielectric layers 182*a*, 182*b*. Thus, the one or more absorptive layers 183 may be interleaved with the plurality of dielectric layers 182. In some embodiments, absorptive layers 183 may be interleaved with the plurality of dielectric layers 182 such that a dielectric layer 182 makes direct contact with transflective layer 181. In other embodiments, absorptive layers 183 may be interleaved with the plurality of dielectric layers 182 such that an absorptive layer 183 makes direct contact with transflective layer 181.

Figure 3:
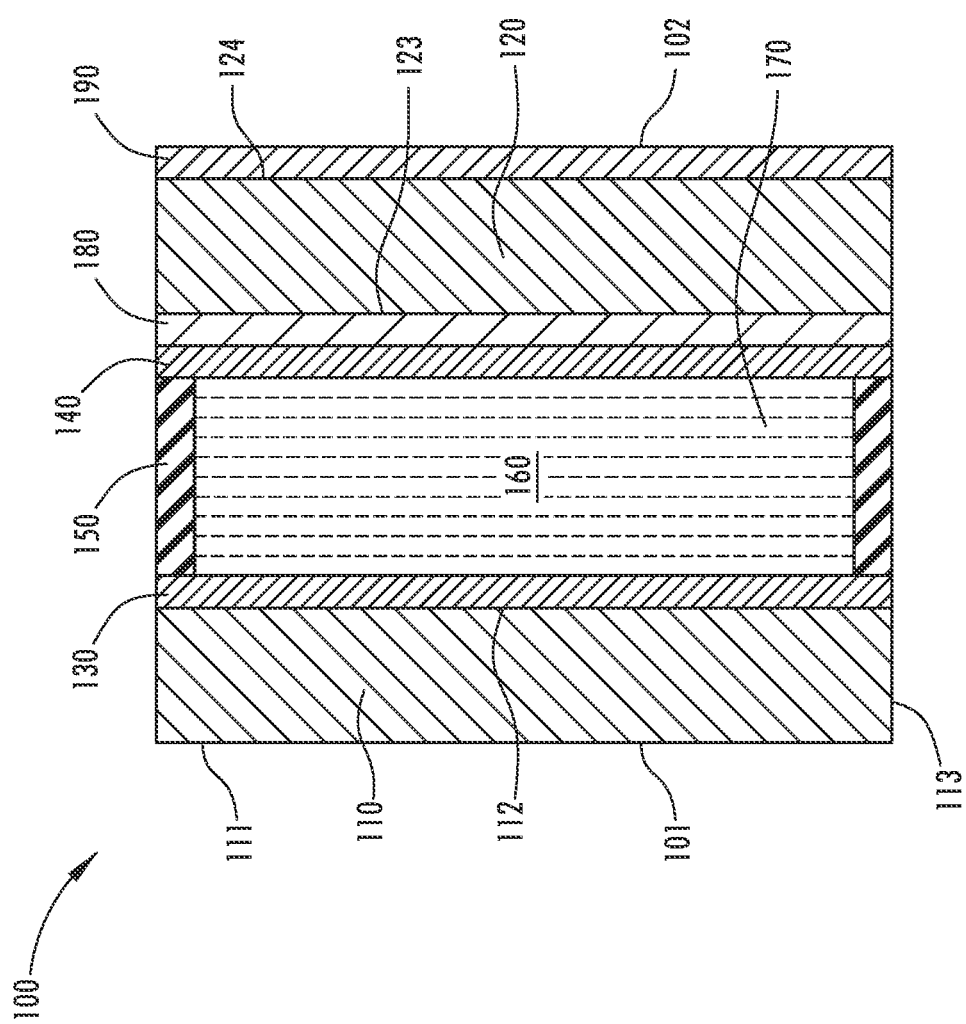
FIG. 3: A cross-sectional schematic representation of an embodiment of a concealment panel.

In some embodiments, as shown in FIG. 3, concealment panel 100 may further include an anti-reflective coating 190. Anti-reflective coating 190 may be disposed at second side 102. Accordingly, in embodiments where concealment panel 100 has a variably reflective and/or transmissive construction, anti-reflective coating 190 may be associated with fourth surface 124. Similarly, in embodiments where concealment panel 100 has a reflectively and/or transmissivity fixed construction and asymmetric transflective coating 180 is associated with first surface 111, anti-reflective coating 190 may be associated with second surface 112. Alternatively, in embodiments where concealment panel 100 has a reflectively and/or transmissivity fixed construction and asymmetric transflective coating 180 is associated with second surface 112, anti-reflective coating 190 may be associated with asymmetric transflective coating 180 such that anti-reflective coating is disposed in the second direction relative asymmetric transflective coating 180. In some embodiments, anti-reflective coating 190 may have a multi-layer construction. The multi-layer construction may comprise multiple dielectric layers. Thus, one or more layer of anti-reflective coating 190 may have a material composition similar to dielectric layers 182.

Imager 200 may be any device operable to capture light in the second wavelength range and generate one or more corresponding images. For example, imager 200 may be a camera. Accordingly, imager 200 may be a Semi-Conductor Charge-Coupled Device (CCD) or a pixel sensor of Complementary Metal-Oxide-Semi-Conductor (CMOS) technologies. The one or more images may be of subject 30. Accordingly, the captured light may have been transmitted though concealment panel 100. Thus, in some embodiments, imager 200 may have a field of view corresponding to the driver and/or the passenger compartment of the vehicle. Additionally, imager 200 may be disposed in the second direction relative concealment panel 100. Thus, imager 200 may be operable to receive light in the second wavelength range transmitted through concealment panel 100. In such a configuration, concealment panel 100 may accordingly conceal imager 200 from the subject's 30 view. Further, in some embodiments, imager 200 may be disposed within the cavity 22 of housing 21.

Controller 300 may comprise a memory 310 and a processor 320. Additionally, controller 300 may be communicatively connected to imager 200. Accordingly, controller 300 may be operable to receive the one or more images from imager 200. In some embodiments, controller 300 may be operable to record the one or more images and store them in memory 310. In other embodiments, controller 300 may be operable to perform a biometric authentication based, at least in part, on the one or more images. The biometric authentication may comprise analyzing one or more biometric feature of subject 30 contained in the one or more images and comparing the one or more biometric feature with an authorized biometric profile.

Memory 310 may be operable to store one or more biometric profiles. The one or more biometric profiles may comprise one or more authorized biometric profile. Additionally, memory 310 may be operable to store one or more algorithm. In some embodiments, an algorithm may be operable to analyze one or more images received from imager 300. The one or more images may be analyzed to detect and characterize or quantify a biometric feature imaged therein. Further, the algorithm may compare the biometric feature with one or more of the biometric profiles. Accordingly, the algorithm may be operable to match the biometric feature with a biometric profile. The biometric profile may further provide whether the biometric profile is an authorized profile or not. If the biometric profile is an authorized profile, subject 30 may be determined as an authorized user. Thus, the algorithm may be operable to determine if subject 30 is an authorized user based, at least in part, on the one or more images.

In some embodiments, memory 310 may be operable to store one or more subject profile. The subject profile may be associated with a biometric profile for a subject 30. Further, the subject profile may comprise one or more preference, authorization, or restriction for one or more pieces of equipment. The equipment may be, for example, a vehicle, a vehicle computer, a mirror, a window, a radio, a dashboard, a steering wheel, a foot pedal system, a lighting system, a payment system, and/or a toll system. The preference or restriction may be, for example, a seat position, window tint level, radio station, radio volume, maximum vehicle speed, driving mode, dashboard illumination, mirror position, rearview display vs mirror preference, steering wheel position, pedal position, lighting level or color, and/or payment method. In such an embodiment, the algorithm may be operable to implement one or more of the preferences or restrictions onto one or more of the pieces of equipment.

Processor 320 may be communicatively connected to memory 310. Further, processor 320 may be an electrical circuit operable to execute one or more set of instructions, such as the algorithm. Accordingly, processor 320, for example, may be a central processing unit (CPU).

Figure 6A:
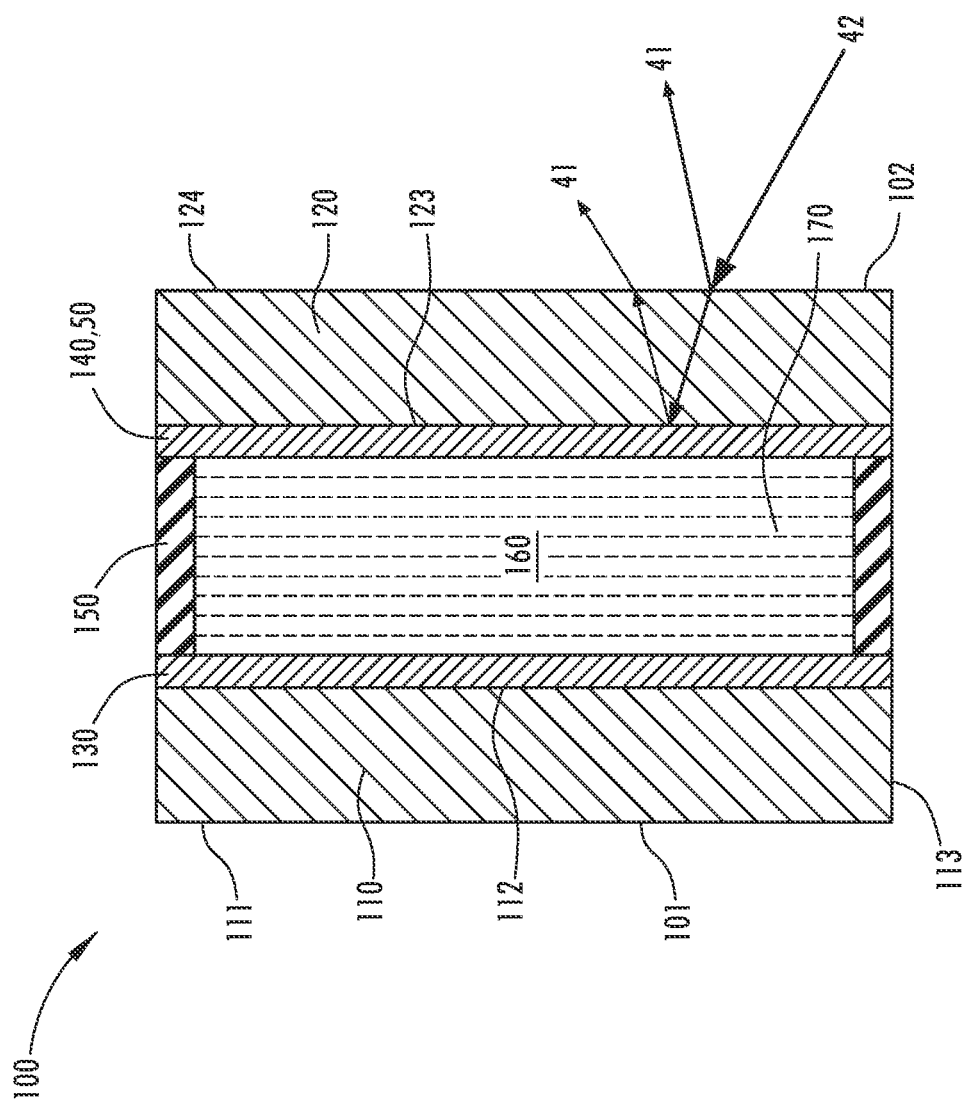
FIG. 6a: A cross-sectional schematic representation of reflections from light impinging the second side of a concealment panel.
Figure 6B:
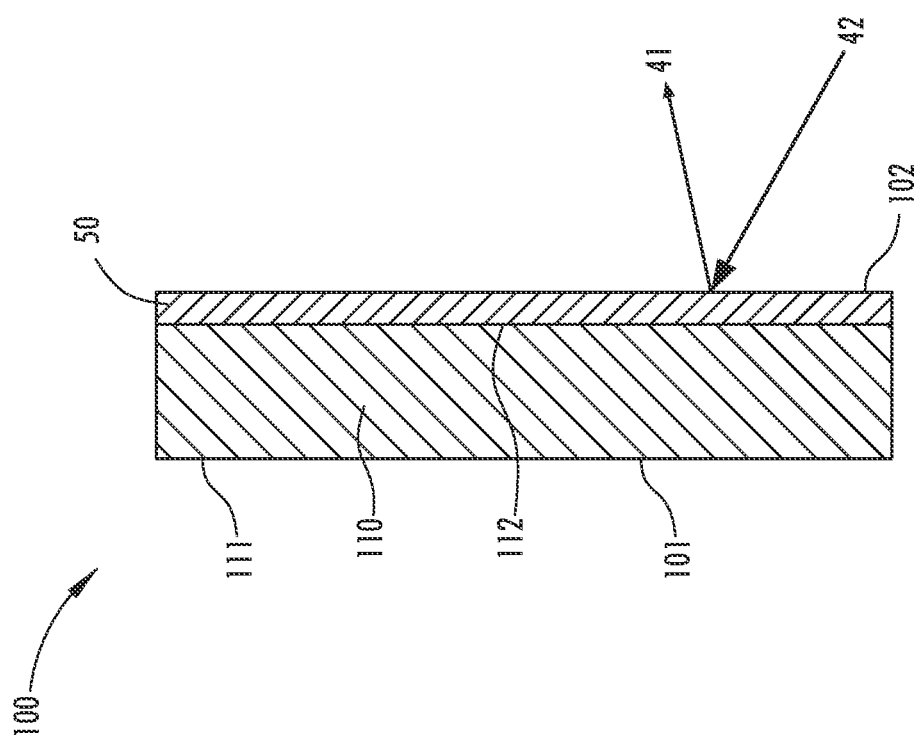
FIG. 6b: A cross-sectional schematic representation of reflections from light impinging the second side of a concealment panel.

Concealment panel 100 and imaging systems 10 incorporating concealment panel 100 may have various advantages. One advantage may be the improvement of image quality in the images captured by imager 200. Prior concealment panels without the asymmetric reflection properties of concealment panel 100 diminished image quality of images positioned there behind. The reflectivity of the sides of these prior concealment panels facing the imagers have a reflectance that is relatively high. In fact, often, the reflectivity of the two sides of these concealment panels are substantially equal. The reflectivity at the surface facing the imager may result in image degradation via one or more "ghost images" 40. These "ghost images" 40 are internal reflections 41 that may be captured by the imager. FIGS. 6a-b illustrate the internal reflections 41 that may occur in a concealment panel having a transflective coating 50 without the asymmetric properties of asymmetric transflective coating 180. Specifically, FIG. 6a illustrates a concealment panel with variably reflective and/or transmissive construction, and FIG. 6b illustrates a concealment having a reflectively and/or transmissivity fixed construction. These figures illustrate impinging light 42 encountering concealment panel at second side 102. Additionally, these figures illustrate the internal reflections 41 that may occur at each surface within the concealment panel. Thus, by minimizing the reflectance of concealment panel 100 at second side 102, while maintaining a relatively high reflectance at first side 101 in order to retain the mirror properties, may minimize the magnitude of at least one internal reflection and thereby reduce or eliminate "ghost images" 40. An example of resulting "ghost images" 40 from prior concealment panels may be seen in FIG. 7a. In this example, these "ghost images" 40 are represented by concentric bright rings. The visibility of these "ghost images" 40 increases in high contrast environments. FIG. 7b illustrates the elimination of these "ghost images" 40 through the implementation of concealment panel 100.

Figure 8:
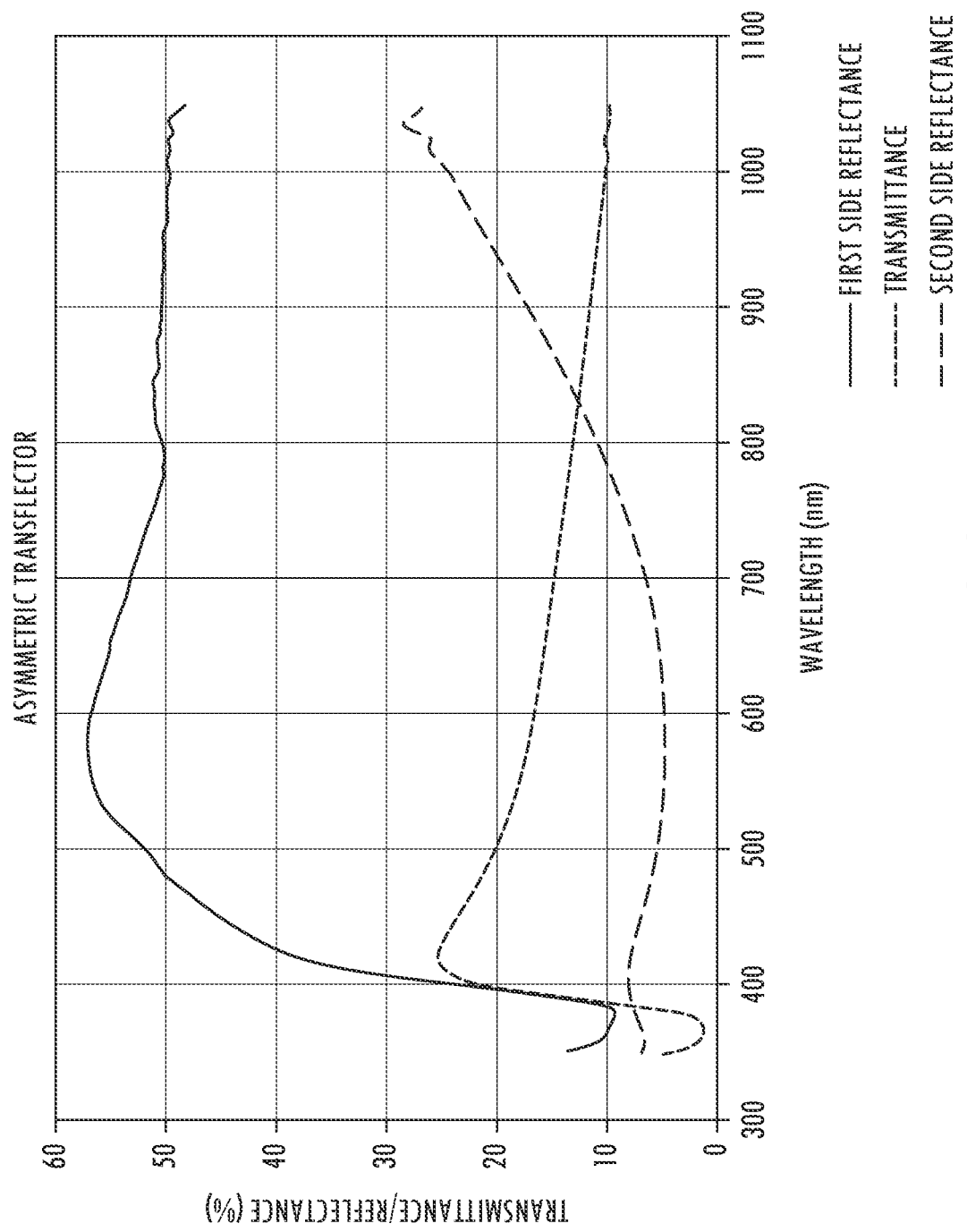
FIG. 8: A graph of reflectances and transmittance of an embodiment of a concealment panel.

In a first example, a concealment panel 100 having a reflectively and/or transmissivity fixed construction was formed with an asymmetric transflective coating 180 having the following construction: a transflective layer 181 was comprised of a 15.8 nm thick silver-gold alloy layer having a seven percent gold composition; first and dielectric layers 182a, 182b were comprised of an ITO having thicknesses of 29.64 and 41.72 nm, respectively, with first dielectric layer 182a directly adjacent transflective layer 181 and second dielectric layer 182b disposed between in the second direction relative first dielectric layer 182a; and an absorptive layer 183 comprised of a 4.72 nm chrome layer disposed between the two dielectric layers 181. The ITO layers were deposited cold and have refractive indices of approximately 2.02. At a wavelength of 550 nm, the silver-gold alloy had a real index of 0.14 and a k value of 3.71 and the chrome had a real index of 2.96 and a k value of 4.28. This concealment panel 100 yielded reflectances and transmittances according to the graph in FIG. 8. FIG. 8 demonstrates the relatively low reflectance of second side 102 across a range of wavelengths. Additionally, FIG. 8 illustrates limited, yet effective, transmittance through concealment panel 100 and/or asymmetric transflective coating 180. Specifically, the average transmittance in the visible region of the electromagnetic spectrum is only approximately 15%. However, test results demonstrated that the image data may be effectively captured and processed to reproduce subject 30 in images captured by imager 200.

In a second example, a concealment panel 100 having a variably reflective and/or transmissive construction was formed with an asymmetric transflective coating 180 having the same construction as in the first example and associated with third surface 123. For this example, the transmittance and reflectances of concealment panel 100 were measured, yielding the values below in Table 1.

TABLE 1

Transmittance and Reflectance of an Embodiment of a Concealment Panel

| | Transmittance | | | First Side | | | | Second Side | | | |
| --- | --- | --- | --- | --- | --- | --- | --- | --- | --- | --- | --- |
| | | | | | Film | | | | Second Substrate | | |
| EC State | T % | a*t | b*t | R % | a*r | b*r | Abs % | R % | a*r | b*r | Abs % |
| Un-Activated | 18.1 | −0.1 | −9.7 | 54.9 | −2.6 | 10.8 | 27 | 5 | 2.6 | −7.7 | 76.9 |
| Activated | 0.7 | −1.4 | −11.8 | 6.1 | 0 | 6 | 93.3 | 4.8 | 2.7 | −7.8 | 94.5 |

As shown in Table 1, the reflectance from second side 102 is dropped to 5%. Additionally, approximately 4% of the reflectance from second side 102 is due to reflectivity arising from fourth surface 124. Accordingly, concealment panel 100 may include an additional coating (e.g. anti-reflective coating 190) on fourth surface 124 to further diminish the reflectance at second side 102.

In a third example, Table 2 illustrates the measured transmittance and reflectances of an example of a concealment panel 100 with an asymmetric transflective coating 180 associated with third surface 123.

TABLE 2

Transmittance and Reflectance of an Embodiment of a Concealment Panel

| | First Side Reflectance | Transmittance | Absorption | Second Side Reflectance |
| --- | --- | --- | --- | --- |
| Y | 59.5 | 18.1 | 22.4 | 7.1 |
| L* | 81.5 | 49.7 | | 32.1 |
| a* | −2.4 | −0.3 | | 4.3 |
| b* | 9.2 | −12.6 | | −10.9 |

To this example, an anti-reflective coating 190 was associated with fourth surface 124. Anti-reflective coating 190 comprised four layer: a first layer, a second layer, a third layer, and a fourth layer. Each of these layers are numbered in order based on proximity to fourth surface 124 with first layer closest to fourth surface 124. The first layer was a 14.2 nm layer of $TiO_2$, the second layer was a 28.2 nm layer of $SiO_2$, the third layer was a 105 nm layer of $TiO_2$, and the fourth layer was an 85.3 nm layer of $SiO_2$. This yielded the measured transmittance and reflectances shown below in Table 3.

TABLE 3

Transmittance and Reflectance of an Embodiment of a Concealment Panel

| | First Side Reflectance | Transmittance | Absorption | Second Side Reflectance |
| --- | --- | --- | --- | --- |
| Y | 59.3 | 18.9 | 21.8 | 3.5 |
| L* | 81.5 | 50.5 | | 22 |
| a* | −2.4 | −0.5 | | 8.4 |
| b* | 9.3 | −12.7 | | −17.3 |

As shown in Table 3 in comparison with Table 2, the reflectance from second side 102 is reduced from 7.1% to 3.5%, yielding a reduction in reflectance of approximately 4%. Such a reduction may further limit the occurrence of "ghost images" as discussed herein.

In a fourth example, a concealment panel 100 with an asymmetric transflective coating 180 associated with third surface 123 between second substrate 120 and second electrode 140 was constructed. In this example, second electrode 140 was a 126.1 nm thick layer of ITO. Additionally, transflective layer 181 comprised a multi-layer stack of alternating relatively high and low refractive index layers whose thicknesses and refractive indices are tuned to create a transflective optical performance. Specifically, the multi-layer stack comprised a first layer, a second layer, a third layer, a fourth layer, and a fifth layer. Each of these layers are numbered in order based on proximity to second electrode 140 with first layer closest to second electrode 140. The first, third, and fifth layers were layers of $TiO_2$ having thicknesses of 113.3, 89.2, and 26.6 nm, respectively. The second and fourth layers were layers of $SiO_2$ having thicknesses of 148.2 and 26.6 nm, respectively. Further, a first dielectric layer 182a comprised of 126.4 nm thick $SiO_2$ was disposed closest to transflective layer 181 and a second dielectric layer 182b comprised of 38.2 thick $TiO_2$ was disposed closest to third surface 123. Additionally, an absorptive layer 183 comprising a 6.8 nm thick layer of Cr was disposed between the first and second dielectric layers 182a, 182b.

This concealment panel 100 yielded reflectances and transmittances according to Table 4, below.

TABLE 4

Transmittance and Reflectance of an Embodiment of a Concealment Panel

|   | First Side Reflectance | Transmittance | Absorption | Second Side Reflectance |
|---|---|---|---|---|
| Y | 60.6 | 18.7 | 20.7 | 6.3 |
| L* | 82.1 | 50.4 | | 30.2 |
| a* | −2.8 | −5.7 | | 6.6 |
| b* | 4.1 | −5.6 | | −24.7 |

As shown in Table 4, the reflectance at second side 102 is approximately 54% less than the reflectance at first side 101.

In a fifth example, Table 5 illustrates the measured transmittance and reflectances of an example of an electrochromic panel. In this panel, second substrate 120 is substantially clear glass and transflective layer 181 is a silver-based layer.

TABLE 5

Transmittance and Reflectance of an Embodiment of a Concealment Panel with a Substantially Clear Second Substrate

|   | First Side Reflectance | Transmittance | Absorption | Second Side Reflectance |
|---|---|---|---|---|
| Y | 65.5 | 23.2 | 11.3 | 61.8 |
| L* | 84.7 | 55.3 | | 82.8 |
| a* | −3 | −1.2 | | −1.6 |
| b* | 2.4 | 1.4 | | −2.1 |

Subsequently, this example was modified such that second substrate 120 was tinted such that it had a standalone transmittance of approximately 45%. This modification yielded the measured transmittance and reflectances shown below in Table 6.

TABLE 6

Transmittance and Reflectance of an Embodiment of a Concealment Panel with a Tinted Second Substrate

|   | First Side Reflectance | Transmittance | Absorption | Second Side Reflectance |
|---|---|---|---|---|
| Y | 65.3 | 11.3 | 23.4 | 18.3 |
| L* | 84.6 | 40.1 | | 49.8 |
| a* | −3 | −1.5 | | −1.9 |
| b* | 2.4 | 2 | | 0.5 |

As shown in Table 6 in comparison with Table 5, the reflectance from second side 102 is reduced from 61.8% to 18.3%, yielding a reduction in reflectance of approximately 44%. While the reflectance at second side 102 is still nearly 20%, which is significantly greater than the 6-8% achieved by other examples, it still achieves a substantial reduction in reflectance. Thus, utilizing a construction where second substrate 120 is tinted may further or alternatively limit the occurrence of "ghost images" as discussed herein.

In some implementations, an imager 200 having a wide filed of view may be desirable. For example, the filed of view may be approximately 70 degrees. In such implementations, there may be an increased potential for the internal reflections or "ghost images." For such implementations, concealment panel 100 may be designed to have a low reflectance when viewed at an angle relative to a normal surface vector or normal incidence from second side 102.

Table 7 demonstrates the measured reflectance of an example of asymmetric transflective coating 100 on third surface 123 compared to a plane glass substrate without a coating.

TABLE 7

Angular Performance of an Example of an Asymmetric Transflective Coating

| Angle | Y - With Coating | Y - Without Coating | Difference |
|---|---|---|---|
| 0 | 6.5 | 4.2 | 2.3 |
| 15 | 6.4 | 4.3 | 2.1 |
| 30 | 6.4 | 4.4 | 2.0 |
| 45 | 7.1 | 5.3 | 1.8 |
| 60 | 11 | 9.2 | 1.8 |

These results demonstrate reflection reduction from asymmetric transflective coating 180 as the angle of incidence increases. This is shown by the difference between the uncoated substrate and the coated substrate decreasing with an increasing angle. Additionally, applying an anti-reflective coating to fourth surface 124 may further limit the reflectance over the range of angles by reducing the reflectance initially contributed by the substrate.

Figure 9:
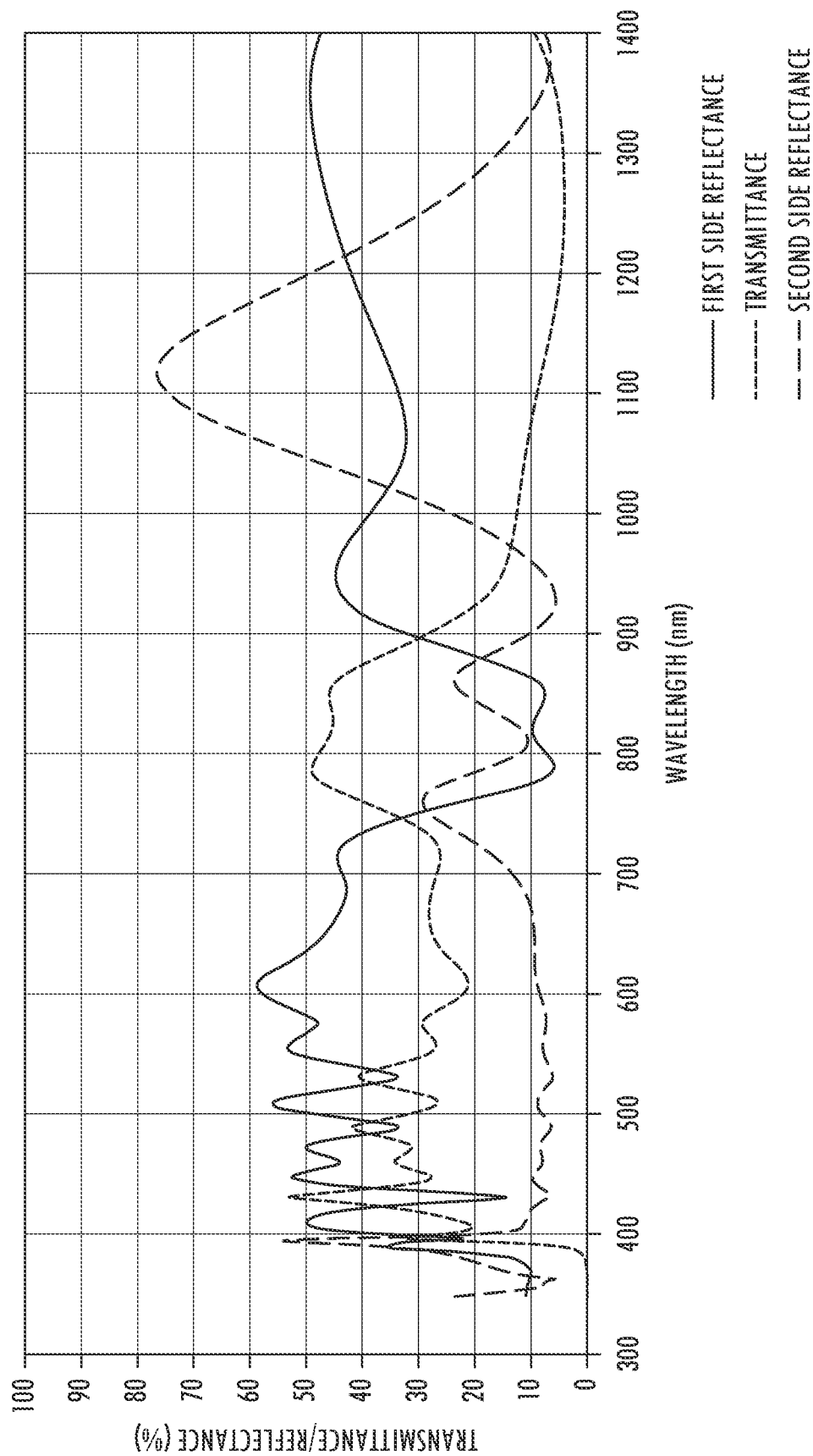
FIG. 9: A graph of reflectances and transmittance of an embodiment of a concealment panel.

In some applications, it may be necessary to have both visible and near infra-red or near infra-red wavelength based imager. Asymmetric transflective coating 180 may be constructed to enable such a system. Accordingly, according to a fifth example, an asymmetric transflective coating 180, associated with third surface 123 having 15 layers. The 15 layers are numbered from 1 to 15 in order based on proximity to third surface 123 with the first layer the furthest from third surface 123. The first layer, a transflective layer 181, was constructed with a 145 nm thick transflective layer 181 of ITO 5/4 Kr. Further, the second, forth, sixth, eighth, tenth, twelfth, and fourteenth layers, dielectric layers 182, were constructed of layers of $SiO_2$ having thicknesses of 170.88, 182.46, 187.53, 166.27, 142.98, 94.27, and 21.30 nm, respectively. Additionally, the third, fifth, seventh, ninth, eleventh, thirteenth, and fifteenth layers, absorptive layers 183, were constructed of layers of $Nb_2O_5$ having thicknesses of 111.50, 129.37, 114.30, 200.38, 35.17, 4.22, and 19.25, respectively. This yielded the measured transmittance and reflectances shown in FIG. 9 and below in Table 8.

TABLE 8

Transmittance and Reflectance of an Embodiment of a Concealment Panel in Both Visible and Near Inra-Red Wavelengths

|   | Reflectance | Absorption | Transmittance |
|---|---|---|---|
| Y | 48.5 | 21.62 | 29.88 |
| L* | 75.14 | | 61.55 |
| a* | 3.75 | | −7.85 |
| b* | 6.64 | | −6 |

The transmittance and asymmetric reflectance from first side 101 and second side 102 of concealment panel 100 in the visible and near infra-red ranges of light may be beneficial for use with imaging systems implemented for driver monitoring and/or biometric authentication. For example, imager 200 may be implemented as a data capture device of biometric scanning or authentication system. In such instances, the image data may include biometric data in the near infrared range and include features necessary to identify subject 30.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

In this document, unless specified otherwise, relational terms, such as "first," "second," and the like, are used solely to distinguish one entity or action from another entity or action, without necessarily requiring or implying any actual such relationship or order between such entities or actions.

The term "transflective" generally refers to an optical configuration that reflects at least a portion of light incident from at least one side and transmits at least a portion of light incident from at least one side. In particular, "transflective" describes an optical element or component that has a non-zero level of transmittance with regard to a wave range of light and also has a non-zero level of reflectance in a region. The applicable wave range of light will vary based on the context. However, in the event the relevant wave range of light is not readily apparent, the wave range in light shall generally refer to visible light.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly comprising:
   a transflective concealment panel having a first side directed in a first direction and a second side directed in a second direction opposite the first direction wherein a reflectance at the first side is greater than a reflectance at the second side, the concealment panel comprising an asymmetric transflective coating, the asymmetric transflective coating having:
   a transflective layer;
   a plurality of dielectric layers disposed in the second direction relative the transflective layer; and
   one or more absorptive layers interleaved with the plurality of dielectric layers; and
   an imager disposed in the second direction relative the concealment panel and operable to capture light transmitted through the concealment panel and generate an image.

2. The rearview assembly of claim 1, wherein the reflectance at the first side is greater than or equal to five times the reflectance at the second side.

3. The rearview assembly of claim 1, wherein the reflectance at the second side is less than or equal to 10%.

4. The rearview assembly of claim 1, wherein the transflective layer has a refractive index of less than or equal to 2.0.

5. The rearview assembly of claim 1, wherein the transflective layer has an imaginary portion of a refractive index of that is greater than a real portion of the refractive index.

6. The rearview assembly of claim 5, wherein the imaginary portion is more than five times greater than the real portion.

7. The rearview assembly of claim 1, wherein the transflective layer comprises a multi-layer stack of alternating high and low refractive index layers.

8. The rearview assembly of claim 7, wherein the alternating high and low refractive index layers are comprised of dielectric materials.

9. The rearview assembly of claim 1, wherein the dielectric layers have a refractive index between about 1.37 and about 4.00.

10. The rearview assembly of claim 1, wherein refractive indices of the absorptive layers have a refractive index of between about 1.0 and about 6.0.

11. The rearview assembly of claim 10, wherein an imaginary portion of the refractive index is less than or equal to about three times a real portion of the refractive index.

12. The rearview assembly of claim 1, wherein an absorptive layer of the one or more absorptive layers makes direct contact with the transflective layer.

13. The rearview assembly of claim 1, further comprising a variably transmissive electro-optic element operable to substantially vary the reflectance at the first side of the concealment panel, the electro-optic element having:

a first substrate having a first surface and a second surface, the first surface disposed in the first direction relative the second surface;

a second substrate disposed in a spaced apart relationship relative the first substrate, the second substrate having a third surface and a fourth surface, the fourth surface disposed in the second direction relative the third surface;

a first electrode associated with the first substrate;

a second electrode associated with the second substrate;

an electro-optic medium operable between substantially activated and un-activated states based, at least in part, on an electrical potential, disposed between the first and second substrates and in the first direction relative the asymmetric transflective coating.

14. The rearview assembly of claim 13, wherein the asymmetric transflective coating is associated with the third surface.

15. The rearview assembly of claim 13, wherein the asymmetric transflective coating is associated with the fourth surface.

16. The rearview assembly of claim 1, further comprising an anti-reflective coating disposed in the second direction relative the asymmetric transflective coating.

17. A member comprising:
a substrate having a first side and a second side;
an asymmetric transflective coating associated with the substrate, the asymmetric transflective coating having:
a transflective layer;
a plurality of dielectric layers; and
one or more absorptive layers interleaved with the plurality of dielectric layers;
wherein the member has a first side and a second side, a reflectance of the first side substantially greater than a reflectance of the second side.

18. The member of claim 17, wherein the reflectance of the first side is greater than or equal to five times the reflectance of the second side.

19. The member of claim 17, wherein an absorptive layer makes direct contact with the transflective layer.

20. The member of claim 17, wherein the reflectance at the second side is less than or equal to 10%.

* * * * *